J. HAMILTON.
KITCHEN UTENSILS.
No. 186,929. Patented Feb. 6, 1877.
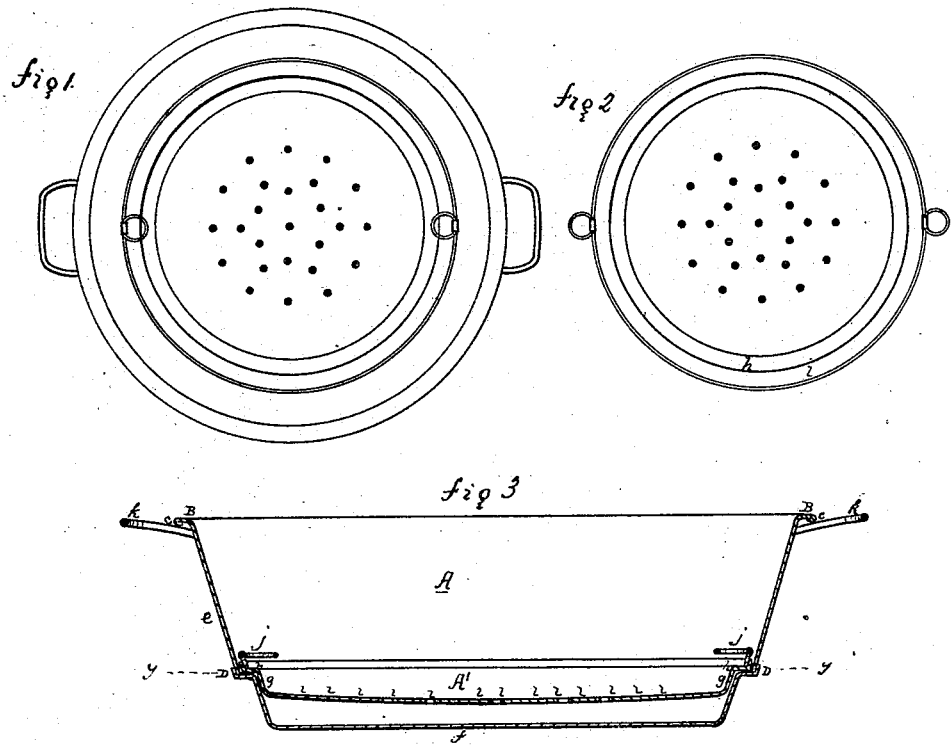
Witnesses
B. L. Johnston
W. Johnston
Inventor
John Hamilton
By A. C. Johnston
his Atty

UNITED STATES PATENT OFFICE.

JOHN HAMILTON, OF PITTSBURG, PENNSYLVANIA.

IMPROVEMENT IN KITCHEN-UTENSILS.

Specification forming part of Letters Patent No. 186,929, dated February 6, 1877; application filed January 2, 1877.

*To all whom it may concern:*

Be it known that I, JOHN HAMILTON, of Pittsburg, in the county of Allegheny and State of Pennsylvania, have invented a new and useful Improvement in Kitchen-Utensils, being a new article of manufacture; and I do hereby declare that the following is a full and exact description thereof, reference being had to the accompanying drawings, and to the letters of reference marked thereon.

My invention relates to an improved article of manufacture—viz., a kitchen-utensil; and consists of a pan provided with a shoulder near its bottom, and a beaded flange projecting outward from its upper edge, said pan being also provided with a flanged detachable second bottom, furnished with perforations for draining, the contour of the draining-bottom corresponding in form to the contour of the lower part of the pan, the peculiar construction of said pan, and its secondary draining-bottom, being of such a character as to impart strength and stiffness to said pan and bottom.

To enable others skilled in the art to make and use my invention, I will proceed to describe its construction.

In the accompanying drawings, which form part of my specification, Figure 1 is a top view of my improved kitchen-utensil. Fig. 2 is a top view of the secondary and draining bottom. Fig. 3 is a vertical section of the pan and its draining-bottom, showing the relative position of the latter with the former.

A represents the pan provided with a shoulder at D, which is connected to rim $e$, which is connected to the bottom $f$. The upper edge of the pan A is provided with an outward-projecting flange, B, the periphery of which is furnished with a bead, C, which flange serves the double purpose of stiffening the upper edge, and acts as a brace to the handles $k$, which are attached to the body of the pan. The secondary draining-bottom A' is furnished with a series of perforations, $l$, for the purpose of draining the articles placed upon it. To the rim $g$ of the bottom A' is connected an outward-projecting flange, $h$, to the outer edge of which is a vertical flange, $i$, to which is attached two hinged rings, $j$.

The draining-bottom A' may be constructed of one piece of sheet metal by the spinning and swaging process. The pan A may also be constructed of one piece of metal by the same means; or that portion below the line $y$ $y$ may be constructed of one piece by the same means, and that portion of the pan above the line $y$ $y$ may be constructed of one or more pieces of sheet metal.

A pan constructed as hereinbefore described will form a very useful and much-needed kitchen-utensil, having great strength and durability, combined with cheapness of manufacture.

The vessel hereinbefore described can be used for the purpose of draining from cooked vegetables, meats, &c., and for other draining common to culinary and household purposes, which will be readily understood by the skilled housewife.

Having thus described my improvement, what I claim as my invention is—

A kitchen-utensil, consisting of the pan A and secondary draining-bottom A', constructed as specified, and adapted to each other, as hereinbefore described, and for the purpose set forth.

JOHN HAMILTON.

Witnesses:
  A. C. JOHNSTON,
  JOHN FLEMING.